(12) United States Patent
Courson et al.

(10) Patent No.: US 6,854,412 B1
(45) Date of Patent: Feb. 15, 2005

(54) UNDERWATER VACUUM ATTACHMENT DEVICE

(75) Inventors: Billy Courson, Panama City Beach, FL (US); John Shelburne, Lynn Haven, FL (US); John Mittleman, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/161,992

(22) Filed: May 31, 2002

(51) Int. Cl.[7] .............................................. B63B 21/27
(52) U.S. Cl. ................. 114/296; 248/205.5; 248/205.8; 248/206.3; 248/683; 294/64.1
(58) Field of Search .................. 248/683, 205.5–206.4; 114/296; 294/64.1

(56) References Cited

U.S. PATENT DOCUMENTS

| | | | | |
|---|---|---|---|---|
| 3,165,899 A | * | 1/1965 | Shatto, Jr. ................... 405/191 |
| 3,720,433 A | * | 3/1973 | Rosfelder ................... 294/64.1 |
| 4,527,783 A | * | 7/1985 | Collora et al. ................. 269/21 |
| 4,669,915 A | * | 6/1987 | Shatto, Jr. ................... 405/191 |
| 4,674,915 A | * | 6/1987 | Shatto, Jr. ................... 405/191 |
| 5,795,001 A | * | 8/1998 | Burke ........................ 294/64.1 |
| 6,502,877 B2 | * | 1/2003 | Schick et al. ................. 294/65 |
| 6,506,166 B1 | * | 1/2003 | Hendler et al. ............. 600/562 |

* cited by examiner

Primary Examiner—Sherman Basinger
(74) Attorney, Agent, or Firm—James T. Shepherd

(57) ABSTRACT

A suction device includes a suction cell formed to include a cup having an open end and a stem extending from a side of the cup opposite from the open end. A control system is connected to the stem and arranged to form a partial vacuum in the cup such that the cup is attached to the substrate. The control system may include an actuator and a strain sensor connected to the stem. The actuator preferably includes a length of a material that includes a shape memory alloy.

4 Claims, 3 Drawing Sheets

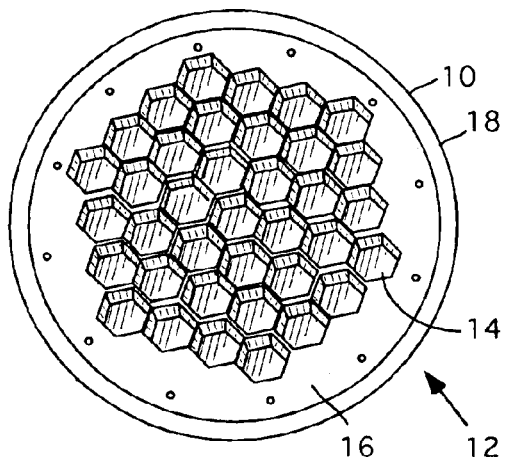
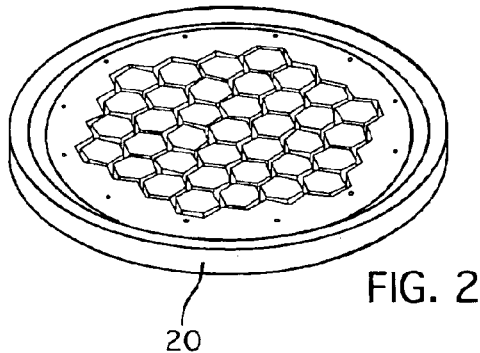
FIG. 1    FIG. 2
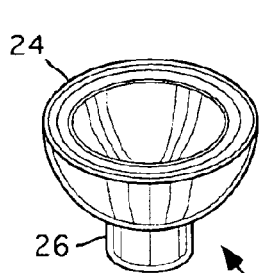
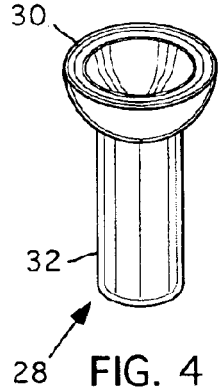
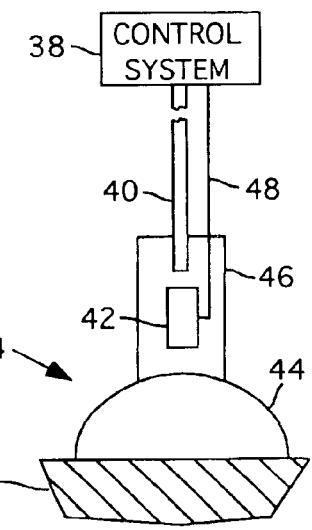
FIG. 3    FIG. 4    FIG. 5
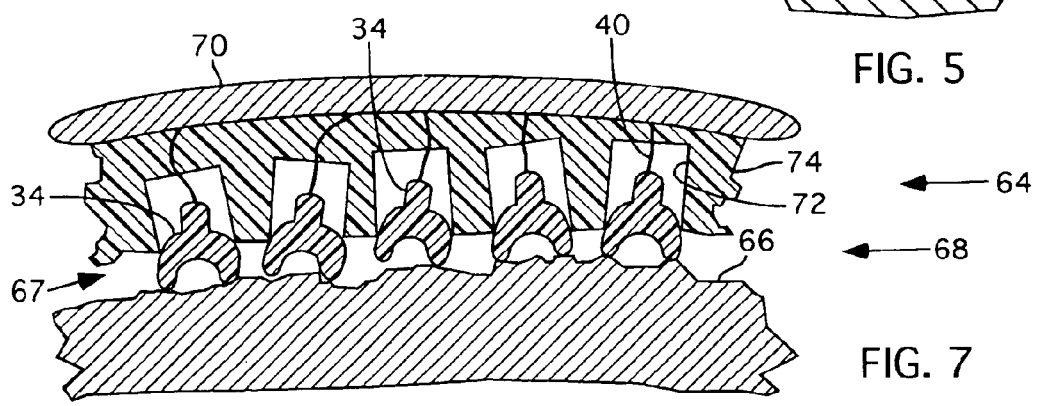
FIG. 7

UNDERWATER VACUUM ATTACHMENT DEVICE

BACKGROUND OF THE INVENTION

This invention relates generally to apparatus and methods for attaching a device to environmentally exposed surfaces, which may be dry or underwater. This invention relates particularly to a non-adhesive attachment system for attaching equipment to surfaces underwater.

SUMMARY OF THE INVENTION

It is an object of the present invention to provide a suction device that may be attached to an underwater surface with the capabilities of sensing suction release and then resetting if suction is lost.

Another object of the invention is to provide a suction device having a plurality of individually controllable suction cells.

Still another object of the invention is to provide a suction device in which each suction cell includes a controllable actuator for attaching the suction cell to an underwater substrate.

Accordingly, the present invention provides a suction device which includes a suction cell formed to include a cup having an open end and a stem extending from a side of the cup opposite from the open end. The suction device further includes a control system connected to the stem and arranged to form a partial vacuum in the cup such that the cup is attached to the substrate.

The suction device according to the invention preferably further comprises a control system connected to an actuator, or control member, and a strain sensor connected between the suction cell and the control system.

This control member comprises a length of a material includes a shape memory alloy.

A suction device according to the invention for attachment to a surface of a substrate may comprise a backplane and a plurality of suction cells mounted to the backplane. Each of the plurality of suction cells preferably comprises a cup having an open end and a stem extending from a side of the cup opposite from the open end; and an actuator connected to the stem for selectively exerting a force to compress the open end of the cup against the surface of the substrate to form a partial vacuum in the cup such that the cup is attached to the substrate.

The suction device may further comprise a matrix mounted to the backplane with the matrix having a plurality of cavities therein arranged in corresponding relation to the plurality of suction cells with the suction cells. The suction cells are preferably mounted inside the cavities such that each of the plurality of suction cells may be independently controlled for attachment to the substrate.

The features of the invention may be more fully understood and appreciated by referring to the drawings described briefly below and by referring to the detailed description of the invention.

BRIEF DESCRIPTION OF THE DRAWINGS

FIG. 1 is a bottom plan view of a vacuum attachment device according to the invention;

FIG. 2 is a perspective view of a mold that may be used in forming the vacuum attachment device of FIG. 1;

FIG. 3 is a perspective view of a first structure for a suction cell that may be included in the invention;

FIG. 4 is a perspective view of a second structure for a suction cell that may be included in the invention;

FIG. 5 shows a suction cell that includes a control wire and a strain sensor connected to a control system;

FIG. 7 shows an array of suction cells adjacent a rough surface of a substrate;

DETAILED DESCRIPTION OF THE INVENTION

Figure 6:
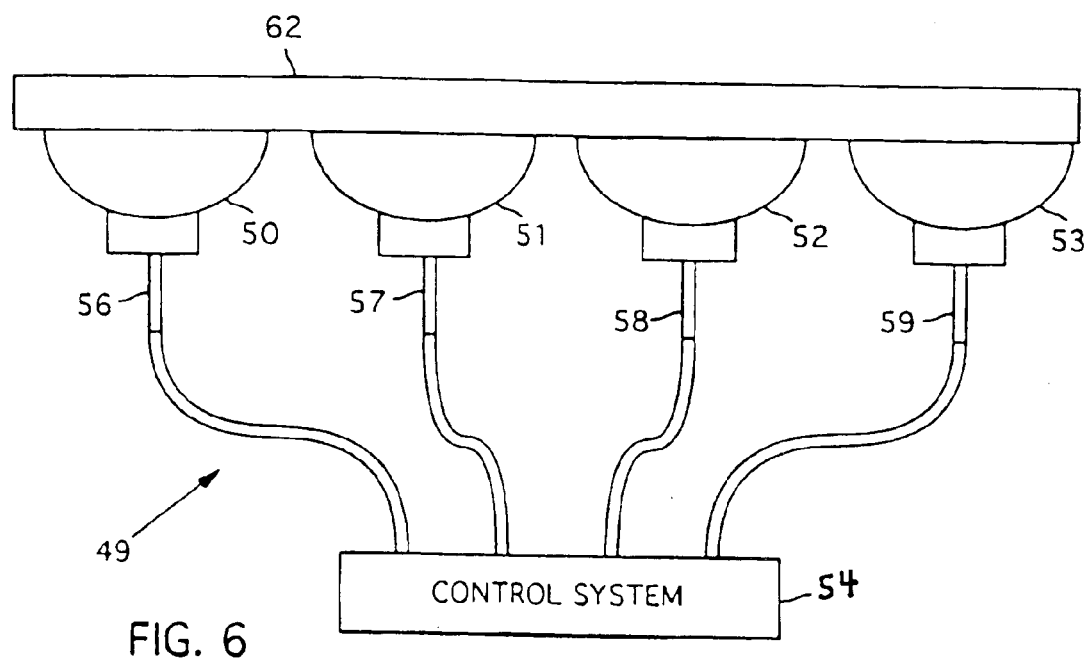
FIG. 6 is a block diagram showing a control system connected to a plurality of suction cells.

FIG. 1 illustrates a multipore suction attachment device 10 that includes an array 12 of suction cells (or pores) 14. The suction cells 14 are shown to hexagonal, which facilitates forming the array 12 to be closely packed. However, other shapes, such as circular as shown in FIGS. 3 and 4 may be used. The array 12 of suction cells 14 is preferably attached to backplane 16 that has a sealing ring 18.

FIG. 2 shows a mold 20 that may be used to form the array 12. The suction cells 14 preferably are formed of a material such as a urethane composite material.

As shown in FIG. 3, a suction cell 22 may include a cup 24 that is generally hemispherical and a stem 26 that is generally cylindrical. The stem 26 has a length that is less than the diameter of the cup 24. The cup 24 is preferably formed of a soft urethane that preferably has Shore A15 hardness, and serves as a deformable sealing material, capable of sealing against a surface having significant roughness. In repeated trials sealing the soft urethane material on a corroded surface with peak-to-peak roughness in excess of 0.1 in. was attained.

FIG. 4 shows a suction cup 28 having a hemispherical cup 30 and a cylindrical stem 32 that is substantially longer than the diameter of the stem 32.

FIG. 5 illustrates a suction cell system 34 attached to a substrate 36. The suction cell system 34 includes a control system 38, an actuator 40 and a strain sensor 42. The strain sensor 42 may be a conventional piezoelectric strain sensor. The suction cell system 34 includes a cup 44 and a stem 46. An electrical conductor (or control wire) 48 connects the strain sensor 42 to the control system 38.

The actuator 40 is formed of one of certain metallic alloys, preferably titanium nickel (Ti—Ni), and is embedded into the stem 46. Such wires exhibit a property known as the "shape memory effect." An alloy exhibiting the shape memory effect has a crystal structure that changes to another structure of a different length at a distinct temperature. One may deform a piece of such an alloy, but when it is heated past a certain transition temperature, usually well under 100° C. and below the melting point, the alloy will return to the shape it had prior to being deformed. A force is generated by the change in shape. Wires formed of a shape memory alloy (SMA) are commonly called "muscle wires" and are commercially available.

Below the transition temperature a piece of a shape memory alloy, for example the wire 40, can be easily stretched and deformed. If it is then heated, either directly or electrically, above the transition temperature, it will return to its unstretched, undeformed shape, which is why such materials are called shape memory alloys. A typical shape memory alloy wire can typically be stretched by up to about 8% of its original length and still contract to its original length when heated above the transition temperature. For repeated expansion-contraction cycles, a length change of about 5% is generally preferred.

The usable force generated by a piece of SMA wire can be quite substantial, but is only generated by the contraction of a stretched wire. This means that in an actuator based upon a practical shape memory alloy, the wire must contract against an opposing force that will then stretch the wire as soon as the temperature of the wire drops below its transition point.

The transition temperature depends on the type of alloy, and can be very precisely defined during manufacturing by careful control of the percentages of the different elements. The most common shape memory alloy is made from nearly equal proportions of nickel and titanium. A 1% difference in the ratio of these two metals can lead to changes in the transition temperature in the range −100° C. to +100° C. Shape memory alloys are normally designed for use at room temperature and have transition temperatures of about +7° C. However, higher transition temperatures are used where the cycle of contraction and stretching needs to be at a much higher rate than normal. The standard maximum cycling rate is about 50 cycles per minute. The transition temperature is in fact spread over a small range, with the contraction temperature being slightly different from the relaxation temperature.

In the present invention the actuator wire 40 may be heated by application of an appropriate electrical current from the control system 38. Controlling the electrical heating of the actuator wire 40 enables the cup 44 to be pushed against the substrate or pulled away from it, depending upon the temperature of the actuator wire 40. Pushing the cup 44 of the suction cell system 34 against the substrate 36 forces fluid out of the cup 44. If the force is then reduced, the cup 44 tends to assume its uncompressed shape and may be assisted by a spring providing an opposing force, which causes a partial vacuum if the cup 44 is sealed against the substrate 36. A signal from the strain sensor 42 to the control system 38 indicates the suction force generated in the cup 44. The control system 38 controls the suction of the suction cell 34 by using a release/retry loop if the suction cell 34 is not holding a vacuum.

FIG. 6 shows an array 49 of suction devices 50–53 that may be formed as shown in FIG. 5 connected to a control system 54. The suction devices 50–53 include corresponding shape memory alloy wires 56–59 arranged as described above to exert forces on the suction devices to attach them to a substrate 62.

As shown in FIG. 7, a multipore suction attachment device 64 is shown adjacent a substrate 66. The multipore attachment device 64 includes an array 68 that preferably comprises an array 67 of suction cup systems 34 such as that shown in FIG. 5. The suction cup array is attached to a hard shell 70 to provide multiple independent attachment points between the multipore suction attachment device 64 and the substrate 66. Individual suction cup vacuum is controlled by exciting the wires in a simple preprogrammed fashion or through a feedback control system 38 as described above with reference to FIG. 5. The individual suction systems 34 in the array 67 are contained in generally cylindrical cavities 72 in a matrix 74 that may be formed of urethane or the like.

In either case, the attachment is preferably maintained by independently controlling suction pressure between the suction cells 34 and the attachment surface 66. The geometry of individual suction cells 34 preferably is circular for individual cells or for a linear array, and hexagonal for closely packed cells. The individual suction cells 34 may be separated by a small distance to allow independent orientations and cell wall deformations. Alternatively, adjacent suction cells may have shared cell walls. Binding individual suction cells 34 in a very soft matrix 74 will allow the proper local orientation of individual cells. That matrix 74 is, in turn, bound to the hard, external shell 70 to distribute external forces.

Activation of the multipore suction device 64 requires tension to be applied to the center of each cell 34 while the perimeter of the cup 44 is held in contact with the surface 66. In conventional suction cups (not shown), the tensile force is supplied by precompression of the cup itself, or by evacuating the fluid under the cup 44, and the volume captured between the cup 44 and the sealing surface 66 changes in response to the decreased pressure under the cup 44. The compressibility of water (and hence the change in captured volume) is negligible. The incompressibility of water is an asset in activating the multipore suction device 64, since only a small volume change is necessary in order to create a low-pressure region between the suction cells 34 and the sealing surface 66.

Alternative means of tensioning the suction cells include the previously mentioned compliance of the urethane itself, and variations based on composite structures formed of urethanes or other materials with appropriate stiffness values, as well as evacuating water in the individual cells by means of a pump that may be actuated by a diver. Note that the actual change in volume is only the amount that results from compressing the soft urethane seal, since the water is essentially incompressible.

Figure 8:
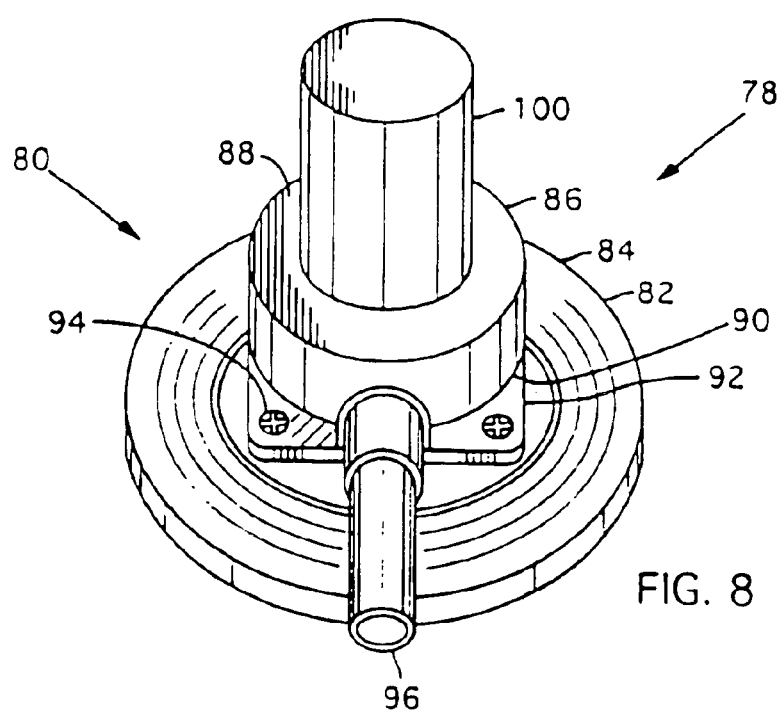
FIG. 8 is a perspective view of a vacuum attachment device according to the invention with an appliance fixturing site.
Figure 11:
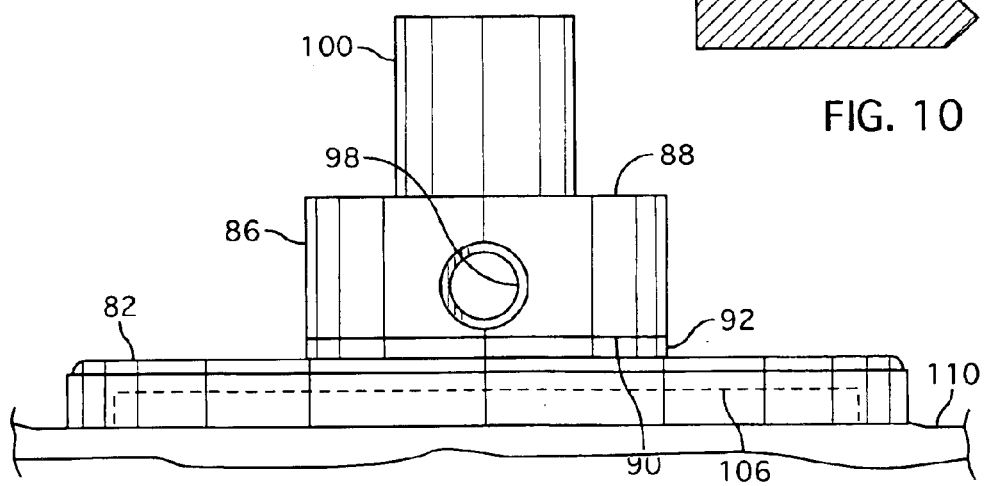
FIG. 11 is a front elevation view of the vacuum attachment device of FIGS. 8 and 9.

FIG. 8 is a perspective view of a pump actuated vacuum attachment device 78 that includes a single suction cell 80. FIG. 8 shows a backing plate 82 that forms an outer surface 84 of the vacuum attachment device 78. As shown in FIGS. 8 and 11, a hollow cylinder 86 is connected to the outer surface 84 of the vacuum attachment device 78. The hollow cylinder 86 has a closed outer end 88 and an open inner end 90 that is connected to a mounting plate 92. The mounting plate 92 is attached to the backing plate 84 by screws 94 or other similar fasteners. The hollow cylinder 86 includes a tube 96 that is arranged for connection to a pump (not shown). As shown in FIGS. 8 and 11, the tube 96 is mounted in a side opening 98 of the hollow cylinder 86.

An appliance-mounting fixture 100 extends from the outer end 88 of the hollow cylinder 86. After the vacuum attachment device 78 is mounted to a surface other apparatus (not shown) may be mounted on the appliance-mounting fixture 100.

Figure 9:
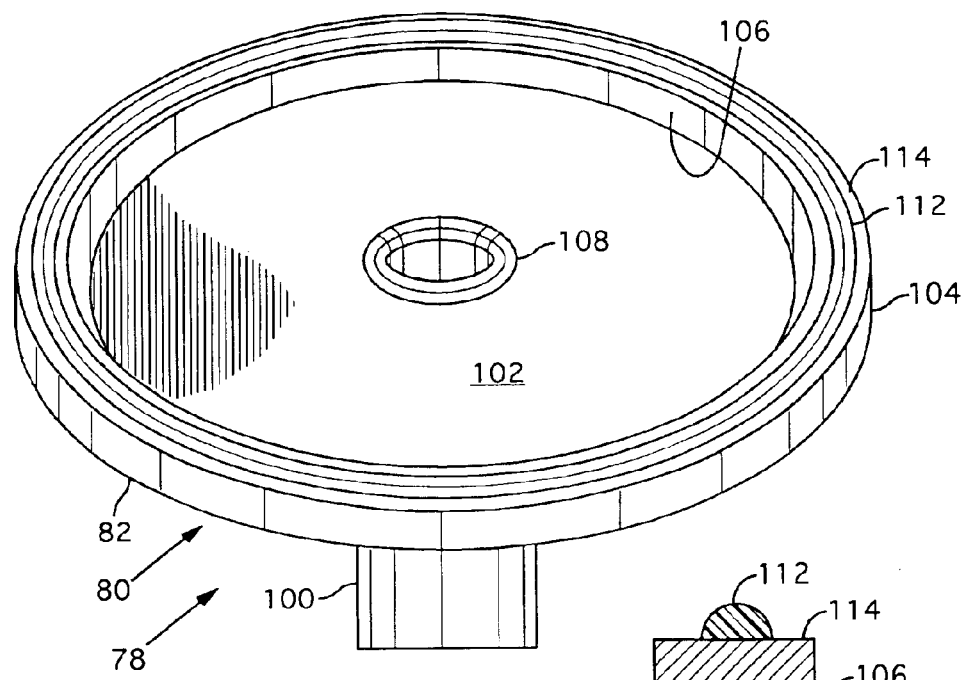
FIG. 9 is a bottom plan view of the vacuum attachment device of FIG. 8.

FIG. 9 is a bottom perspective view of the backing plate 82. A bottom surface 102 is recessed in the backing plate 82. A sidewall 104 of the backing plate forms a cylindrical ring around the bottom surface to form a cavity 106. A passage 108 extends through the bottom surface 102 so that the cavity 106 is in fluid communication with the tube 96. Pumping apparatus (not shown) may then be used to draw water from the cavity 106 to form a vacuum attachment between the vacuum attachment device 78 and a surface 110, shown in FIG. 11.

Figure 10:
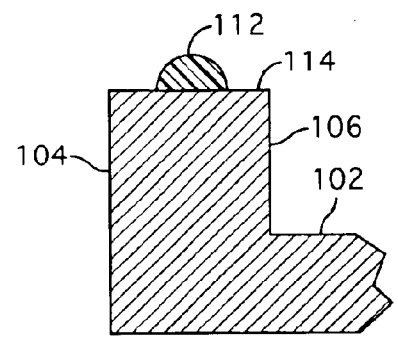
FIG. 10 is an enlarged cross sectional view of a portion of the vacuum attachment device of FIG. 9.

As shown in FIGS. 9 and 10, a sealing bead 112 may be mounted on an outer edge 114 of the sidewall 104. The sealing bead 112 may be formed of any suitable flexible substance such as urethane. To mount the vacuum attachment device 78 on the surface 110, a diver (not shown) carries it to a selected underwater attachment site, pushes it against the surface 110 and turns on a power switch to start pumping water from the cavity 106. Pumping is stopped when a predetermined pressure is reached in the cavity 106.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A suction device for attachment to a surface of a substrate, comprising:
    a suction cell formed to include a cup having an open end and a stem extending from a side of the cup opposite from the open end;
    a control member connected to the stem for selectively producing a partial vacuum in the cup such that the cup is attached to the substrate;
    a control system connected to the control member; and
    a strain sensor mounted to the stem and connected to the control system;
    wherein the control member comprises a length of a material that includes a shape memory alloy.

2. A suction device for attachment to a surface of a substrate, comprising:
    a backplane;
    a plurality of suction cells mounted to the backplane, each of the plurality of suction cells comprising:
        a cup having an open end and a stem extending from a side of the cup opposite from the open end; and
        a control member connected to the stem for selectively exerting a force to compress the open end of the cup against the surface of the substrate to from a partial vacuum in the cup such that the cup is attached to the substrate;
    a matrix mounted to the backplane, the matrix having a plurality of cavities therein arranged in corresponding relation to the plurality of suction cells with the suction cells being mounted inside the cavities such that each of the plurality of suction cells may be independently controlled for attachment to the substrate;
    a control system connected to the control member for each of the plurality of suction cells; and
    a strain sensor connected between each of the suction cells and the control system;
    wherein each of the control members comprises a length of a material that includes a shape memory alloy.

3. A method of forming a suction device for attachment to a surface of a substrate, comprising the steps of:
    forming a suction cell to include a cup having an open end and a stem extending from a side of the cup opposite from the open end;
    forming a control member to comprise a length of a material that includes a shape memory alloy;
    connecting the control member to the stem for selectively producing a partial vacuum in the cup such that the cup is attached to the substrate;
    connecting a control system to the control member; and
    connecting a strain sensor between the suction cell and the control system.

4. A method for forming a suction device for attachment to a surface of a substrate, comprising the steps of:
    providing a backplane;
    mounting a plurality of suction cells to the backplane, each of the plurality of suction cells comprising a cup having an open end and a stem extending from a side of the cup opposite from the open end;
    forming a plurality of control members each comprising a length of a material that includes a shape memory alloy;
    connecting one of the control members to each of the stems for selectively exerting a force to compress the open end of its corresponding cup against the surface of the substrate to form a partial vacuum in the cup such that the cup is attached to the substrate;
    mounting a matrix to the backplane, the matrix having a plurality of cavities therein arranged in corresponding relation to the plurality of suction cells with the suction cells being mounted inside the cavities such that each of the plurality of suction cells may be independently controlled for attachment to the substrate;
    connecting a control system to the control member for each of the plurality of suction cells; and
    connecting a strain sensor between each of the suction cells and the control system.

* * * * *